3,725,121
THERMALLY STABLE PRESSURE-SENSITIVE ADHESIVE TAPE WITH POLYPROPYLENE BACKING

Albert Anthony Fournier, Bridgewater, N.J., assignor to Johnson & Johnson
No Drawing. Filed Apr. 9, 1971, Ser. No. 132,879
Int. Cl. C09j 7/02
U.S. Cl. 117—122 PF          6 Claims

ABSTRACT OF THE DISCLOSURE

A heat resistant polypropylene backed acrylate pressure-sensitive adhesive tape wherein the acrylate adhesive is modified by the addition of 5–25 percent of a phenol formaldehyde resin prior to coating on the polypropylene backing.

---

The present invention relates to polypropylene pressure-sensitive adhesive tapes and more particularly to such tapes wherein a biaxially oriented polypropylene film is coated on one of its major surfaces with a pressure-sensitive and normally tacky acrylate adhesive with or without a primer coating interposed between the adhesive and the polypropylene film to increase the anchorage of the adhesive to the film. A typical tape of this type is described in Robinson et al. U.S. Letters Pat. No. 3,241,662 which generally describes one type of terpolymeric acrylate adhesive. However, most of the eleven advantages enumerated in columns 1 and 2 of the Robinson et al. patent also may be attained in polypropylene tapes using other acrylate adhesives possessing similar characteristics. All of these acrylate adhesives are naturally clear and naturally tacky materials which do not require the addition of tackifying resins and the various other additives which are necessary with rubber-based adhesives.

These acrylate adhesives may be described generally as being based on a copolymer comprising a major amount of an elastomeric medium chain length alkyl acrylate monomer or monomers and a smaller amount of one or more adhesion inducing unsaturated aliphatic polar monomers which are copolymerizable with the medium chain length monomers. The adhesive also may include other cohesion or hardness inducing short chain monomers and normally will comprise at least a small amount of some kind of crosslinking monomer and a crosslinking catalyst. Adhesives of this type are described in Ulrich U.S. Letters Pat. No. Re. 24,906 and Doehnert U.S. Letters Pat. No. 3,558,574, as well as in the Robinson et al. patent.

The Robinson et al. patent mentions that one advantage of polypropylene films in these tapes is that the films are relatively heat stable and therefore can be processed at the temperatures encountered in coating and drying of pressure-sensitive adhesives. However, when pressure-sensitive tapes of the type described, i.e., comprising a polypropylene film backing and an acrylate adhesive, are used in applications where they must retain their effectiveness for extended periods of time at relatively high temperatures such as for electrical insulation and in similar environments, the tape fails in that the polypropylene backing literally disintegrates. This type of failure is characterized by the appearance of surface eruptions and blisters which gradually spread across the whole tape surface until it loses all resemblance to its original physical condition. For most purposes, even the slightest surface eruption of this type is unacceptable and the insulation characteristics of the tape quickly drop below acceptable limits as soon as this type of disintegration begins to occur.

Tapes conventionally are rated for high temperature service on the basis of continuous exposure to a given temperature for at least 20,000 hours. For instance, high temperature pressure-sensitive adhesive tapes normally are rated at temperatures ranging between 90–105° C., meaning that they will withstand the temperature selected for 20,000 hours without degradation or disintegration or without losing the required insulating characteristics if the tape is used for insulation purposes, or the like. Tapes comprising a polypropylene film backing coated with an acrylate adhesive tend to fail in about 500 hours when tested at 100–105° C. and therefore fall far short of the required rating period of 20,000 hours at these temperatures. When they are tested at a considerably higher temperature, such as 145° C., they fail much more rapidly, i.e., in as short a time as 4–10 hours.

I have discovered that this problem can be minimized and that 20,000 hour ratings at temperatures of 90° C.–105° C. and above can be attained in polypropylene acrylate tapes of this type by adding a phenol formaldehyde resin to the adhesive to form a modified adhesive composition prior to coating the composition onto the polypropylene film backing. The phenol formaldehyde resins suitable for this purpose may be described as being the heat condensation product of formaldehyde with a phenol conforming to the following general formula:

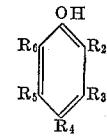

wherein at least two of $R_2$, $R_4$ and $R_6$ are H, and the remaining member of $R_2$, $R_4$ and $R_6$, as well as $R_3$ and $R_5$, each are one of H, OH and X, wherein X is an alkyl, aryl, alkyl aryl or halogen group. Typical of these phenols are phenol, ortho cresol, meta cresol, para cresol, octyl phenols, nonyl phenols, para phenyl phenol, para cyclohexyl phenol, resorcinol, 135 xylenol, catechol, bisphenol, meta chlorophenol, etc. About 5–25% of the resulting phenol formaldehyde resin by weight of the adhesive monomer solids may be used to produce the tape of this invention, although about 9–15% is preferred for optimum results since a slight loss of pressure-sensitive adhesive properties begins to occur at the upper end of the range. In fact, within this preferred range of phenol formaldehyde resin addition, many of the tapes of this invention will last for 400–500 hours or more at 145° C. without disintegrating or failing in any other way.

The phenol formaldehyde resins useful in this invention include both the oil soluble and alcohol soluble varieties, as well as the heat reactive and non-heat reactive resins. The heat reactive resins are resoles, wherein at least one mole of formaldehyde is condensed with each mole of the phenol to form the resin; whereas the non-heat reactive resins are Novolaks, wherein less than one mole of formaldehyde is condensed with each mole of phenol in what normally is a two-stage process to form the resin. Typical of preferred oil soluble resoles are the para octyl substituted phenol formaldehyde resins. However, they also may be used in the form of Novolak resins. Resins formed by condensing phenol or meta cresol with formaldehyde are examples of alcohol soluble resins which may be used. The resins of this invention may be based on monohydric phenols or polyhydric phenols, amino-phenols, halogen substituted phenols, etc., and may include polyphenyl phenols, as well as those with various cyclic substitutions as indicated above.

As indicated hereinbefore, a wide variety of acrylates may be used in forming the adhesive tape of this invention. These acrylates are unique in that they are polymerized directly from the elastomeric and the adhesion inducing monomers into pressure-sensitive and normally tacky copolymeric adhesive form. The adhesives of this invention may be defined more specifically as comprising a copolymer of monomers comprising a major amount by weight of the total monomers of elastomeric medium chain length alkyl acrylate monomers wherein the alcohol moiety comprises an average of about 4–12 carbon atoms, and about 0.5–25 parts by weight of the total monomers of adhesion inducing copolymerizable unsaturated aliphatic polar monomers selected from the group consisting of acids, acid anhydrides, esters, amides and nitriles. The adhesion inducing unsaturated aliphatic polar monomers must be copolymerizable with the elastomeric monomers and conform to one of the following general formulae:

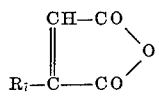

or

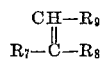

wherein $R_7$ is H or $CH_3-$, and $R_8$ is

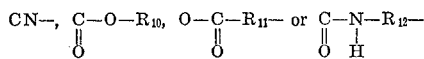

and $R_9$ is H,

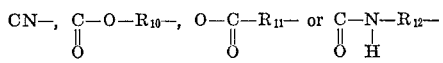

wherein $R_{10}$ is H, $CH_3-$, $C_2H_5-$ or $C_3H_7-$ and $R_{11}$ is $CH_3-$, $C_2H_5-$, or $C_3H_7-$, and $R_{12}$ is H, or a substituted or unsubstituted aliphatic group of less than 10 carbon atoms. However, preferably, $R_9$ is H.

These polar monomers may be in the form of acids, acid anhydrides, esters, amides and nitriles typified by acrylic acid, itaconic acid, maleic anhydride, methyl acrylate, methyl methacrylate, ethyl acrylate, vinyl acetate, N-tertiary-butyl acrylamide, diacetone acrylamide, acrylonitrile, methacrylonitrile, and the like. Substituted acrylamides conforming to the following general formula have produced good results:

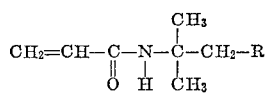

where R is either H or

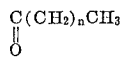

wherein $n$ is a number of 0 through 10.

Doehnert U.S. Letters Pat. No. 3,558,574 defines a particular type of alkoxy silyl crosslinking monomer and organo-metallic salt catalysts to be used therewith in the crosslinking of acrylate adhesives of the general type described in this application. Thus, these adhesives may include small amounts of these or other crosslinking monomers or catalysts, as well as polymerization catalysts and the like. In fact, other monomers may be employed in the basic acrylate adhesive copolymer in relatively small amounts to modify various properties of the resulting adhesive. These might include vinyl chloride, butadiene, isoprene and similar materials which are readily copolymerizable with the acrylates.

As indicated hereinbefore, the tape of this invention is produced by coating a polypropylene backing sheet with a modified pressure-sensitive adhesive composition of this invention. The phenol formaldehyde resin modifier may be added to the acrylate adhesive copolymer simply by mixing the resin in the form of a solid or as a solution in toluene, for example, with the acrylate adhesive.

In the tape of this invention, the backing sheet simply may be a film of biaxially oriented polypropylene as described in the Robinson et al. patent, or it may consist of a film of this type laminated with some kind of porous substrate such as paper or a nonwoven fabric. However, the substrate must be sufficiently porous to allow the acrylate adhesive to come in contact with the polypropylene in order for the features of this invention to become effective. Obviously, this would include reinforced tapes formed by laminating a layer of filaments with a polypropylene film backing or by laminating the film with a filamentary mat formed of a material such as polyethylene terephthalate. Polypropylene films having different characteristics may be used, although biaxially oriented film is preferred for most applications. In some cases, a thin primer layer may be coated on the polypropylene film prior to coating with the adhesive in order to increase the anchorage of the adhesive layer to the polypropylene and, although it is not normally necessary for release purposes, coatings may be applied to the nonadhesive surface of the polypropylene film to modify its surface characteristics as desired.

The following examples are given only by way of illustration and are not intended to limit the scope of the present invention in any way.

EXAMPLE I

The following acrylate adhesives are formulated as indicated and then thoroughly mixed and polymerized as generally described in United States Letters Patent application Ser. No. 744,173, U.S. Pat. No. 3,617,362, and Patents Nos. 3,241,662 and 3,558,574, cited hereinbefore, to produce acrylate adhesives of the type useful in this invention.

Adhesive formulations

ADHESIVE FORMULATIONS

| Adhesives | Parts per 100 parts of the total monomers | | | |
|---|---|---|---|---|
| | A | B | C | D |
| Adhesive monomers: | | | | |
| Octyl acrylate | 75 | 75 | 75 | 75 |
| Methyl methacrylate | 21 | | | 21.5 |
| Vinyl acetate | | | 22 | 18 |
| Acrylic acid | 4 | 3 | | |
| Maleic anhydride | | 2 | | |
| Diacetone acrylamide | | | 5 | |
| Acrylamide | | | | 3.5 |
| Trimethoxysilylpropyl methacrylate | .02 | .024 | .06 | .02 |

The trimethoxysilylpropyl methacrylate is a crosslinking monomer of the type explained in more detail in United States application Ser. No. 744,173 and Pat. No. 3,558,574. In adhesives A, B and D, crosslinking proceeds fairly rapidly without the need for an additional crosslinking catalyst. In adhesive C, a crosslinking catalyst, i.e., 0.8 part of dibutyltin bis 2-ethylhexoate is used, although it is not absolutely necessary.

The resulting acrylate adhesives have the following approximate Williams plasticities.

| Adhesive: | Williams plasticity (mm.) |
|---|---|
| A | 1.9–2.5 |
| B | 1.2–2.9 |
| C | 1.2–1.7 |
| D | 2.3–3.0 |

Williams plasticity is determined as follows. A wet film of the solution adhesive is coated on silicone release paper so as to produce a dry film approximately 1½ mils in thickness. It is dried five minutes at 195–200° F. in a circulating air oven. The adhesive is removed from the silicone paper and a pellet exactly 2 grams in weight is formed in the shape of a ball. The sample ball is placed between two plasticity papers and conditioned for 15 minutes at 100° F. The plasticity papers consist of papers with a highly glossy clay coated surface facing the plasticity pellet. The Williams plasticity is the thickness of the pellet in mm. after 15 minutes compression at 100° F. in the plastometer under a 5 kg. load.

EXAMPLES II–XI

Adhesive compositions according to this invention are made by mixing the following phenol formaldehyde resins suitable for use in this invention with 100 parts of Adhesive A in the proportions indicated in the following Table A.

TABLE A

| Example | Phenol formaldehyde resin modifier | Percent resin [1] | Failure time (hrs.) |
|---|---|---|---|
| II | None | 0 | 7–24 |
| III | Resin K para octyl phenol formaldehyde resole resin. | 3 | 55½–73 |
| IV | Resin K, as above | 6 | 98–120 |
| V | do | 9 | 161–187 |
| VI | do | 12 | >456 |
| VII | do | 15 | 336–372½ |
| VIII | do | 25 | >456 |
| IX | Amberol ST–137 para octyl phenol formaldehyde resole resin. | 9 | 161–187 |
| X | Amberol ST–137X para octyl phenol formaldehyde Novolak resin. | 9 | >456 |
| XI | SP–12 para butyl phenol formaldehyde resole resin. | 9 | 120–137 |

[1] Solids by weight of total adhesive monomer solids.

These adhesive compositions, identified to Examples III–XI in Table A (Example II using the control Adhesive A without a phenol formaldehyde resin modifier), are applied to a treated surface of a biaxially oriented polypropylene film of 1.25 mils in thickness in such a way as to deposit a dry adhesive layer weighing about 1.2 oz. per square yard. The treated surface, referred to, is produced by any one of the ways described in the paragraph overlapping columns 2 and 3 of Patent. No. 3,241,662, or by any other technique which will enhance its anchorage characteristics. The adhesive is coated on the film in a conventional manner and dried for approximately 5 minutes in an air circulating oven at about 210° F. Subsequently, the adhesive coated film is slit into tapes about one inch wide which are wound upon themselves to form rolls with the adhesive side of the tape facing inwardly. Samples of each of the tapes made with the adhesive compositions of Examples II–XI are applied around the outside of conventional one quart screw cap glass jars approximately 3 inches in outer diameter and placed in an oven maintained at 145° C. with vigorous air circulation. In each case, the adhesive side of the tape is pressed firmly against the glass to assist in stabilizing the sample with respect to shrinkage.

Periodic observations then are made to determine the approximate time when surface degradation or disintegration beings to appear. The first observation of any eruption on the polypropylene film is noted as the point of failure. The ranges given, i.e., 7–24, for Example II means that this tape sample failed sometime between 7–24 hours after being placed in the oven. It will be noted that the last point of observation was at 456 hours with the tapes of three examples, i.e., VI, VIII and X, showing no sign of degradation.

Although the control Example II is indicated as failing between 7–24 hours, and the 3% resin tape of Example III between 55½–73 hours, it is not accurate to compare these examples on time alone because the tape of Example II shows complete or overall disintegration, whereas the tape of Example III (and those of Examples IV and V) display only slight surface eruptions within the time limits given. Generally speaking, therefore, particularly at 6% resin and above, the temperature resistance of the tapes of this invention is at an entirely different order of magnitude than that of the control which does not include any phenol formaldehyde resin modifier. This is true even under the accelerated heat failure conditions which exist at 145° C.

EXAMPLES XII–XIV

The following examples were made up and tested for failure as described in connection with Examples II–XI using acrylate adhesive formulations B, C and D with 9% Resin K added as in Example IX to form the adhesive composition of this invention. The resulting tapes were applied to glass quart jars and tested for failure at 145° C. as described in the foregoing examples with the results indicated in Table B, below:

TABLE B

| Example | Adhesive formulation | Failure time (hrs.) Control (no resin) | Failure time (hrs.) Tape with 9% resin |
|---|---|---|---|
| XII | B | 7–24 | 276–288 |
| XIII | C | 4½–7 | >456 |
| XIV | D | 7–24 | >456 |

EXAMPLES XV–XX

When certain materials such as pigments are added to the adhesive composition of this invention, the resistance of the resulting tape to heat degradation is reduced. However, even at the reduced level of heat resistance, the addition of phenol formaldehyde resins according to this invention are effective to increase the heat resistance of the resulting tape as compared with a control sample which contains no such resin. To illustrate this type of adhesive modification, the treated surface of the polypropylene of the foregoing examples is first coated with a very thin layer of an ethylene-vinyl acetate-methacrylyl chloride copolymer primer at a dried coating weight of approximately 0.002 oz. per square yard, then about 17.5 parts per 100 parts of the total adhesive monomer solids of a blue pigment is added to the formulation of Adhesive A. The resulting blue adhesive is modified in accordance with this invention by adding various percentages of Resin K phenol formaldehyde resin. Each of the modified adhesives then is coated on the primed side of the polypropylene film, dried and made into tapes as described in connection with the foregoing examples. This time, the resulting tape samples are pressed flat onto a polytetrafluoroethylene covered steel panel and tested for failure at 145° C. in an air circulating oven. Failure is observed in the same way as described in connection with the foregoing examples when the tape was applied to glass jars. The following Table C indicates the results for the various levels of phenol formaldehyde modifier and for a control Example XV which is unmodified.

TABLE C

| Example | Percent resin [1] | Failure time (hrs.) |
|---|---|---|
| XV | 0 | 9 |
| XVI | 3 | 26–36 |
| XVII | 6 | 46–47 |
| XVIII | 9 | 72–100 |
| XIX | 12 | 138–147 |
| XX | 15 | 173–190 |

[1] Solids by weight of total adhesive monomer solids.

The control tape of Example XV is observed as failing at 9 hours, whereas the modified tapes of this invention exhibit a much greater resistance to failure, and at 9% resin modification and above last about 10 or more times longer than the control sample.

In the foregoing examples, Resin K is a para octyl phenol formaldehyde resole resin supplied as a 60% solids solution in toluene. It has a solids melting point of 95–105° C. (ring and ball), a methylol content of about 8% and a viscosity in a 60% solids solution of approximately 100 cps.

Amberol ST–137 is a similiar para octyl phenol formaldehyde resole resin supplied by Rohm & Haas Co., although it has a somewhat lower melting point. Amberol ST–137X is a para octyl phenol formaldehyde novolak resin also supplied by Rohm & Haas Co. However, this resin is supplied at 100% solids and has a ring and ball melting point of about 85–110° C. It has a viscosity in a 64% solids solution of about 140–300 cps.

Schenectady SP–12 is an alcohol soluble heat reactive resole resin of para butyl phenol and formaldehyde supplied by Schenectady Chemicals Inc. in solid form. It has a capillary tube melting point of about 168° F., a specific gravity of 1.11 and is soluble in aromatic and aliphatic hydrocarbons, ketones and alcohols.

Having now described the invention in specific detail and exemplified the manner in which it may be carried into practice, it will be readily apparent to those skilled in the art that innumerable variations, applications, modifications and extensions of the basic principles involved may be made without departing from its spirit or scope.

What is claimed is:

1. A normally tacky and pressure-sensitive heat stable adhesive sheet which comprises a relatively thin flexible polypropylene backing sheet and a phenol formaldehyde modified pressure-sensitive acrylate adhesive composition coated on at least one major surface of said backing; said composition consisting essentially of a pressure-sensitive and normally tacky acrylate adhesive comprising a copolymer of monomers consisting essentially of a major amount by weight of the total acrylate adhesive monomers of elastomeric alkyl acrylate monomers, and a smaller amount of adhesion inducing copolymerizable unsaturated aliphatic polar monomers; and about 5–25 percent by weight of said acrylate adhesive monomers of a phenol formaldehyde resin, said resin being the heat condensation product of formaldehyde with a phenol conforming to the following general formula:

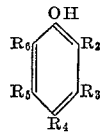

wherein at least two of $R_2$, $R_4$ and $R_6$ are H, and the remaining member of $R_2$, $R_4$ and $R_6$, as well as $R_3$ and $R_5$, each are one of H, OH and X, wherein X is an alkyl, aryl, alkyl aryl or halogen group.

2. A pressure-sensitive adhesive sheet according to claim 1, wherein said elastomeric acrylate monomers are medium chain length alkyl acrylate monomers, wherein the alcohol moiety comprises an average of about 4–12 carbon atoms, and said adhesion inducing polar monomers are selected from the group consisting of acids, acid anhydrides, esters, amides and nitriles and are present in the amount of about 0.5–25 parts per 100 parts by weight of the total acrylate adhesive monomers.

3. A pressure-sensitive adhesive sheet according to claim 2, wherein the adhesion inducing polar monomers conform to one of the following general formulae:

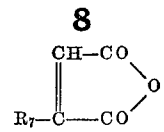

or

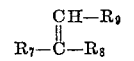

wherein $R_7$ is H or $CH_3$—, and $R_8$ is

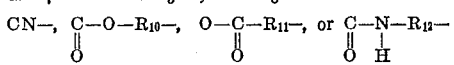

and $R_9$ is

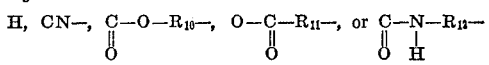

wherein $R_{10}$ is H, $CH_3$—, $C_2H_5$— or $C_3H_7$—, and $R_{11}$ is $CH_3$—, $C_2H_5$—, or $C_3H_7$—, and $R_{12}$ is H, or a substituted or unsubstituted aliphatic group of less than 10 carbon atoms.

4. A pressure-sensitive adhesive sheet according to claim 3, wherein said modified acrylate adhesive composition comprises at least about 9 percent phenol formaldehyde resin modifier by weight of the acrylate adhesive monomers.

5. A pressure-sensitive adhesive sheet according to claim 3, wherein $R_9$ is H.

6. A pressure-sensitive adhesive sheet according to claim 5, wherein $R_{12}$ is

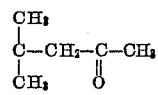

References Cited

UNITED STATES PATENTS

| | | | |
|---|---|---|---|
| Re. 24,906 | 12/1960 | Ulrich | 117—68.5 X |
| 3,231,419 | 1/1966 | Korpman | 117—122 |
| 3,241,662 | 3/1966 | Robinson et al. | 117—122 X |
| 3,269,994 | 8/1966 | Horn et al. | 117—122 X |
| 3,285,771 | 11/1966 | Dabroski | 117—68.5 |
| 3,558,574 | 1/1971 | Doehnert | 117—145 X |

MURRAY KATZ, Primary Examiner

B. D. PIANALTO, Assistant Examiner

U.S. Cl. X.R.

117—7, 68.5, 122 P, 122 PA